(12) United States Patent
Hashimoto (10) Patent No.: US 8,559,060 B2
(45) Date of Patent: Oct. 15, 2013

(54) COLOR PRINTER WITH POWER SAVING RECORDING HEAD

(75) Inventor: Jun Hashimoto, Hamura (JP)

(73) Assignees: Casio Electronics Manufacturing Co., Ltd., Saitama (JP); Casio Computer Co., Ltd., Tokyo (JP)

( * ) Notice: Subject to any disclaimer, the term of this patent is extended or adjusted under 35 U.S.C. 154(b) by 325 days.

(21) Appl. No.: 13/113,233

(22) Filed: May 23, 2011

(65) Prior Publication Data

US 2011/0292418 A1    Dec. 1, 2011

(30) Foreign Application Priority Data

May 25, 2010    (JP) .................................. 2010-119178
Feb. 22, 2011    (JP) .................................. 2011-036303

(51) Int. Cl.
*H04N 1/60*    (2006.01)
*B41J 29/38*    (2006.01)
*B41J 2/015*    (2006.01)
*G01D 15/06*    (2006.01)

(52) U.S. Cl.
USPC ................... 358/1.9; 358/1.8; 347/8; 347/14; 347/37; 347/10; 347/11; 347/20; 347/117; 347/167

(58) Field of Classification Search
USPC .......... 358/1.9, 1.8; 347/8, 14, 37, 10, 11, 20, 347/117, 167
See application file for complete search history.

(56) References Cited

U.S. PATENT DOCUMENTS 5,988,784 A * 11/1999 Takemura et al. ................. 347/8
7,210,756 B2 * 5/2007 Imai ............................... 347/10

FOREIGN PATENT DOCUMENTS

| JP | 02-073379 A | 3/1990 |
|---|---|---|
| JP | 3-104663 A | 5/1991 |
| JP | 07-199582 A | 8/1995 |
| JP | 07-329352 A | 12/1995 |
| JP | 2003-080763 A | 3/2003 |
| JP | 2009-132128 A | 6/2009 |

OTHER PUBLICATIONS

Japanese Office Action dated May 22, 2012 (and English translation thereof) in counterpart Japanese Application No. 2011-036303.

* cited by examiner

*Primary Examiner* — Charlotte M Baker
(74) *Attorney, Agent, or Firm* — Holtz, Holtz, Goodman & Chick, PC (57) ABSTRACT

The present invention relates to a color printer and particularly to a color printer reducing power consumption and complying with international criteria ensuring sustained earth environment. In a color printer having multiple optical writing heads for individual recording colors, the activated periods of individual color recording heads are set to different periods and one writing period of individual recording heads is divided into multiple periods, video data for recording one dot line are divided into multiple blocks in the main scan direction, and the divided video data are used for emission at different times in the sub-scan direction, whereby a smaller number of optical writing elements are simultaneously driven for emission and the peak power consumption of the entire apparatus is reduced.

8 Claims, 10 Drawing Sheets

COLOR PRINTER WITH POWER SAVING RECORDING HEAD

CROSS-REFERENCE TO RELATED APPLICATION

This application claims the benefit of Japanese Patent Application No. 2010-119178, filed May 25, 2010 and Japanese Patent Application No. 2011-036303, filed Feb. 22, 2011, the entire disclosures of which are incorporated by reference herein.

FIELD

This application relates generally to a printer, and more particularly, to a tandem color printer using electrophotography.

BACKGROUND

A tandem printer using electrophotography utilizes, for example, yellow (Y), magenta (M), cyan (C), and black (K) imaging units for printing process in which the recording heads in the imaging units emit light in accordance with print data on the peripheral surfaces of photoconductor drums for exposure to form toner images and the toner images are transferred to a printing medium.

Figure 10:
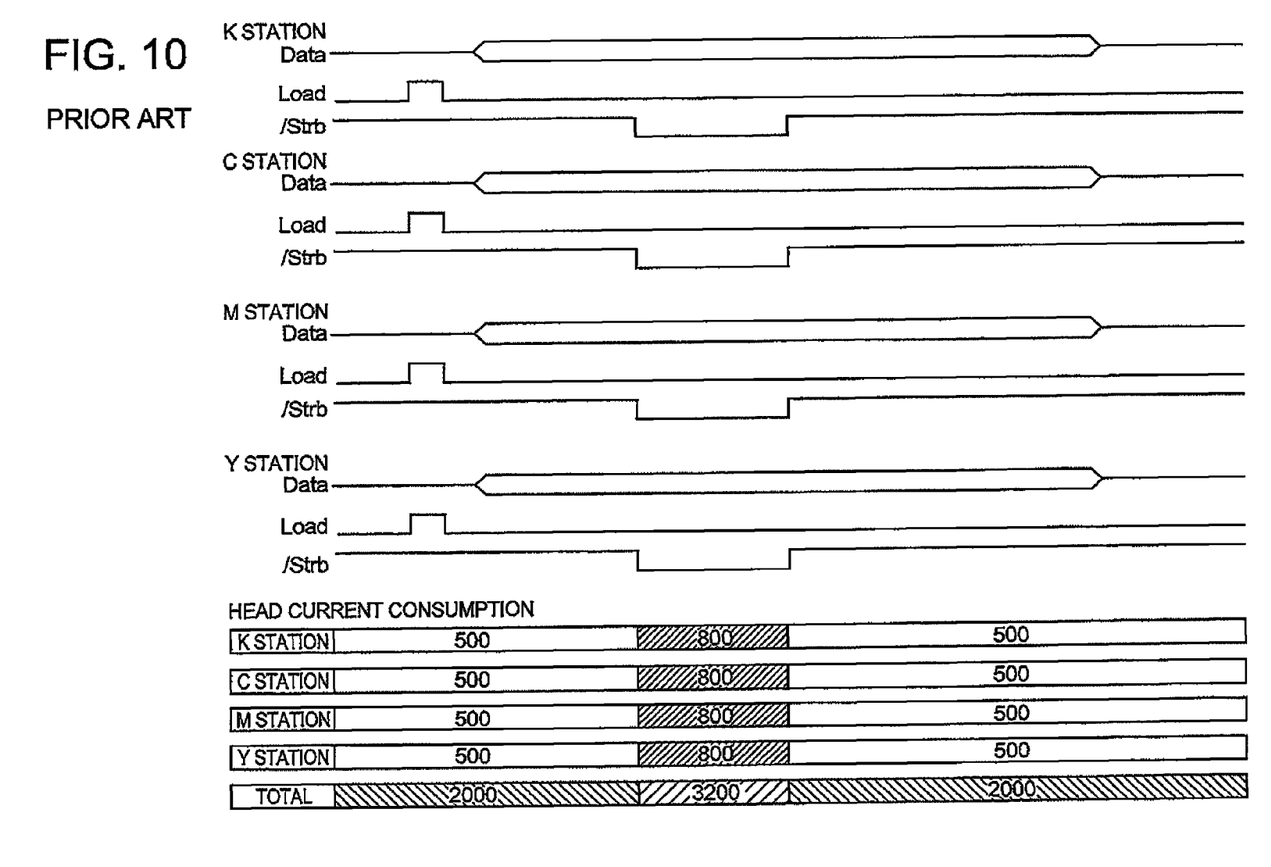
FIG. 10 is a time chart for explaining a prior art operation.

FIG. 10 is an illustration for explaining a prior art control, showing a time chart of controlling yellow (Y), magenta (M), cyan (C), and black (K) stations driving Y, M, C, and K imaging units. As shown in the figure, in the Y, M, C, and K stations, load signals are simultaneously output, individual color print data are supplied, and strobe signals are simultaneously output to drive the individual recording heads.

Therefore, as shown in the figure, the recording heads are equal in power consumption. For example, a current of 500 mA flows through each recording head at the time of not printing and a current of 800 mA flows through the same at the time of printing. In all four imaging units, a total current of 2000 mA flows through the recording heads at the time of not printing and a total current of 3200 mA flows through the same at the time of printing.

A prior art for preventing excessive power consumption is disclosed in Patent Literature 1, in which, for example, the cyan, magenta, yellow, and black LED heads are turned on in sequence to prevent excessive power consumption.

Patent Literature 2 discloses an invention in which the LED array chips are shifted in the sub-scan direction for preventing failure of printed data to be printed on a line because of the LED array chips driven in a time division manner.

[Patent Literature 1] Unexamined Japanese Patent Application KOKAI Publication No. H7-199582
[Patent Literature 2] Unexamined Japanese Patent Application KOKAI Publication No. H7-329352

However, sustained earth environment is called for worldwide and the global warming conference is playing a pivotal role for realizing regulations on emission of greenhouse gasses such as $CO_2$ (carbon dioxide). Under such circumstances, criteria for complying with the "International Energy Star Program" of the ECCJ (Energy Conservation Center, Japan) are set on electric appliances such as printers, facsimiles, copiers, personal computers (PCs), and displays.

The above-described prior art printers are designed to supply a large current to the recording heads at the time of printing, requiring large power consumption. Then, their design does not comply with the above "International Energy Star Program."

The present invention provides a printer reducing power consumption and complying with the international criteria ensuring sustained earth environment.

SUMMARY

In order to achieve the above object, the present invention provides a color printer creating video data corresponding to n colors based on print information entered from a host machine, supplying individual color video data to corresponding recording color optical writing recording heads comprising an array of many light emitting elements arranged in a main scan direction, forming individual color images by exposing the individual color image lights consequently emitted on corresponding photoconductive bodies for recording color, the photoconductive bodies being provided to face the optical writing recording heads and moving in a sub-scan direction perpendicular to the main scan direction to form individual color images, and finally merging all color images on a printing medium to form a color image, wherein the color printer comprises a recording head selection/activation unit activating individual color recording heads in sequence to enable optical writing in each of periods equal to one n-th of one writing period of the optical writing recording heads; a video data supply unit applying video data corresponding to one dot line image to be recorded to the recording heads during an activated period of individual recording color recording heads; a staggered emission drive signal generation unit generating x staggered emission drive signals for each of individual recording color recording heads during the activated period of individual recording color recording heads; and a divided emission control unit selectively activating a block comprising a given number of light emitting elements of the individual color recording heads so as to allow the light emitting elements in the block to selectively emit light based on video data applied to the recording head during each of staggered emission drive periods, and the individual recording color recording heads are provided in the manner that the blocks are shifted in the sub-scan direction by the quantity to cancel the emission time-lag between the light emitting elements in different blocks activated with time-lag by the staggered emission drive signals.

In order to achieve the above object, the present invention provides a color printer creating video data corresponding to n colors based on print information entered from a host machine, supplying individual color video data to corresponding recording color optical writing recording heads comprising an array of many light emitting elements arranged in a main scan direction, forming individual color images by exposing the individual color image lights consequently emitted on corresponding photoconductive bodies for recording color, the photoconductive bodies being provided to face the optical writing recording heads and moving in a sub-scan direction perpendicular to the main scan direction to form individual color images, and finally merging all color images on a printing medium to form a color image, wherein the color printer comprises a recording head selection/activation unit activating individual color recording heads in sequence to enable optical writing in each of periods equal to one n-th of one writing period of the optical writing recording heads; a video data dividing/supply unit dividing an activated period of individual recording color recording heads into a first half period and a second half period and applying only video data corresponding to the first half in the main scan direction of one dot line data to the print heads in the first half period and only video data corresponding to the second half in the main scan direction of the one dot line data to the recording heads in the second half period; a staggered emission drive signal generation unit generating x staggered emission drive signals for each of individual recording color recording heads in each of the first half period and second half period of individual recording color recording heads; and a divided emission control unit selectively activating a specific block of light emitting elements of the individual color recording heads so as to allow the light emitting elements in the block to selectively emit light based on video data applied to the recording head during each of staggered emission drive periods, and the individual color recording heads are provided in the manner that the blocks are shifted in the sub-scan direction by the quantity to cancel the emission time-lag between the light emitting elements in different blocks activated with time-lag by the staggered emission drive signals.

The present invention can provide a printer reducing the maximum power consumption of the entire apparatus compared with the prior art and complying with the international criteria ensuring sustained earth environment.

BRIEF DESCRIPTION OF THE DRAWINGS

A more complete understanding of this application can be obtained when the following detailed description is considered in conjunction with the following drawings, in which.

DETAILED DESCRIPTION

Embodiments of the present invention will be described hereafter with reference to the drawings.

Figure 2:
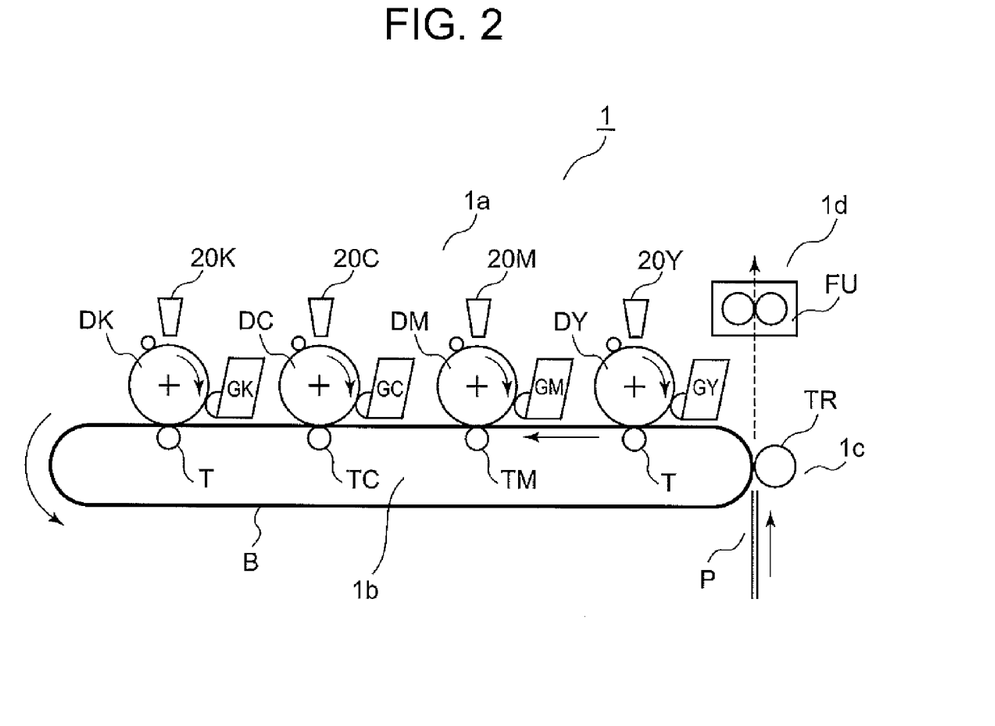
FIG. 2 is a schematic illustration showing the entire structure of a color printer of this embodiment.

FIG. 2 is a schematic illustration showing the entire structure of a color printer 1 of the present invention.

The color printer 1 of the present invention comprises an imaging unit 1a forming four, yellow (Y), magenta (M), cyan (C), and black (K), print color toner images on photoconductor drums, a primary transfer unit 1b transferring the toner images formed on the photoconductor drums to a transfer belt, a secondary transfer unit 1c further transferring the toner images transferred to the transfer belt to a paper P, and a heat fixing unit 1d heat-fixing the toner image transferred to the paper P on the paper P.

More specifically, the imaging unit 1a comprises individual color recording heads 20Y, 20M, 20C, and 20K, photoconductor drums DY, DM, DC, and DK to be exposed to image light emitted by the recording heads 20Y, 20M, 20C, and 20K based on print data, and developers GY, GM, GC, and GK developing latent images formed on the exposed individual photoconductor drums DY, DM, DC, and DK using individual color toners.

The primary transfer unit 1b comprises transfer units TY, TM, TC, and TK transferring the individual color toner images to a transfer belt B to form a merged image from the individual color toner images developed on the photoconductor drums DY, DM, DC, and DK.

The secondary transfer unit 1c comprises a secondary transfer roll TR. The transfer belt B on which all color toner images are transferred and merged is conveyed to the secondary transfer unit 1c, where the image is transferred to a paper P or a printing medium by the secondary transfer roller TR. The toner image secondary-transferred on the paper P is further heat-fixed by a heat-fixing unit FU at the heat fixing unit 1d.

The recording heads 20Y, 20M, 20C, and 20K facing the surfaces of the photoconductor drums 20DY, 20DM, 20DC, and 20DK rotating in the sub-scan direction consist of an array of many small LED (light emitting diode) elements lined up in the axial direction of the photoconductor drums 20DY, 20DM, 20DC, and 20DK (the main scan direction perpendicular to the sub-scan direction). The LED elements are selectively driven based on print data. The uniformly charged photoconductor drums 20DY, 20DM, 20DC, and 20DK are exposed to the light emitted by the LED elements so as to discharge the surfaces of the photoconductor drums 20DY, 20DM, 20DC, and 20DK. Then, electrostatic latent images corresponding to the exposure light images are formed on the photoconductor drums 20DY, 20DM, 20DC, and 20DK and the electrostatic latent images are developed by toner absorbed from the corresponding developers 20GY, 20GM, 20GC, and 20GK by electrostatic force to form visible images.

The individual color toner images formed at the individual color imaging units 1a are transferred to the transfer belt B by the primary transfer unit 1b as described above and further transferred to a paper P by the secondary transfer unit 1c. The heat fixing unit 1d heat-fixes the color image to the paper P, which is discharged on a not-shown catch tray.

Figure 3:
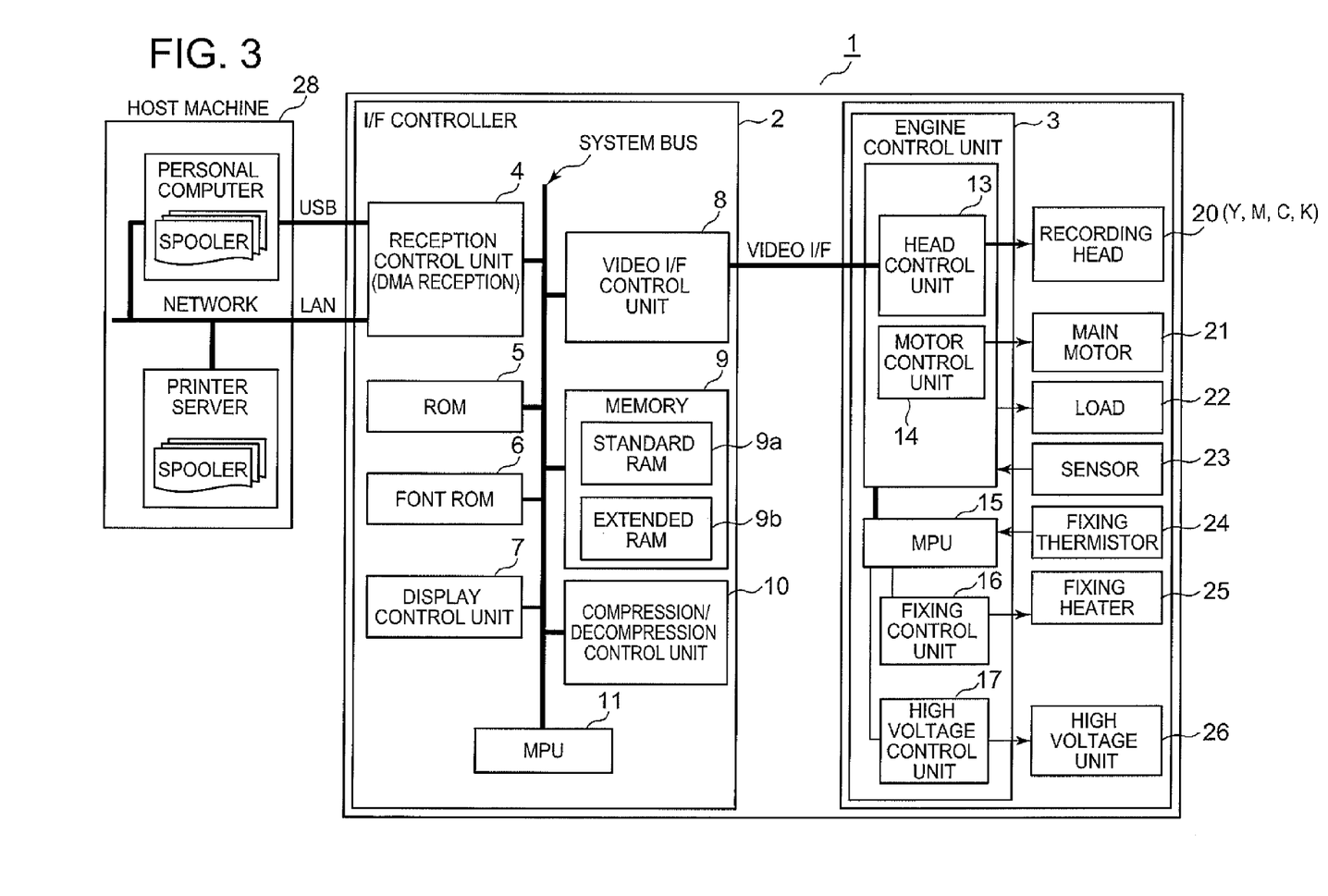
FIG. 3 is an illustration for explaining the control system of the color printer of this embodiment.

FIG. 3 is an illustration for explaining the control system of the color printer 1 having the above basic structure. In the figure, the color printer 1 comprises an interface controller ("I/F controller" hereafter) 2 and an engine control unit 3. The I/F controller 2 comprises a reception control unit 4, an ROM 5, a font ROM 6, a display control unit 7, a video I/F control unit 8, a memory 9 (standard RAM 9a and extended RAM 9b), a reduction/enlargement control unit 10, and an MPU 11.

The engine control unit 3 comprises a head control unit 13, a motor control unit 14, an MPU 15, a fixing control unit 16, and a high voltage control unit 17. The head control unit 13 sends video data to the above-described recording head 20 (20Y, 20M, 20C, and 20K). The motor control unit 14 outputs drive signals to multiple main motors 21. Various loads 22 are driven/controlled by the engine control unit 3. Detection signals of a sensor 23 such as a paper ejection sensor are supplied to the engine control unit 3.

The MPU 15 receives information on detected temperature of a not-shown fixing roller from a fixing thermistor 24 provided in the above-described heat fixing unit FU and outputs temperature control signals to a fixing heater 25 provided to the fixing roller. Furthermore, the high voltage control unit 17 outputs high voltage control signals to the high voltage unit 26.

The color printer 1 having the above configuration is supplied with print data from a host machine 28 such as a personal computer (PC) and printer server via a Centronics interface and LAN (local area network).

The print data supplied from the host machine 28 are transferred to the reception control unit 4. After a specific amount of print data are transferred to the reception control unit 4, the print data are transferred to the memory 9 (for example, the standard RAM 9*a*). The print data transferred to the memory 9 are analyzed under the control of the MPU 11, reduced/enlarged by the reduction/enlargement control unit 10, and then output to the engine control unit 3 from the video I/F control unit 8.

Figure 1:
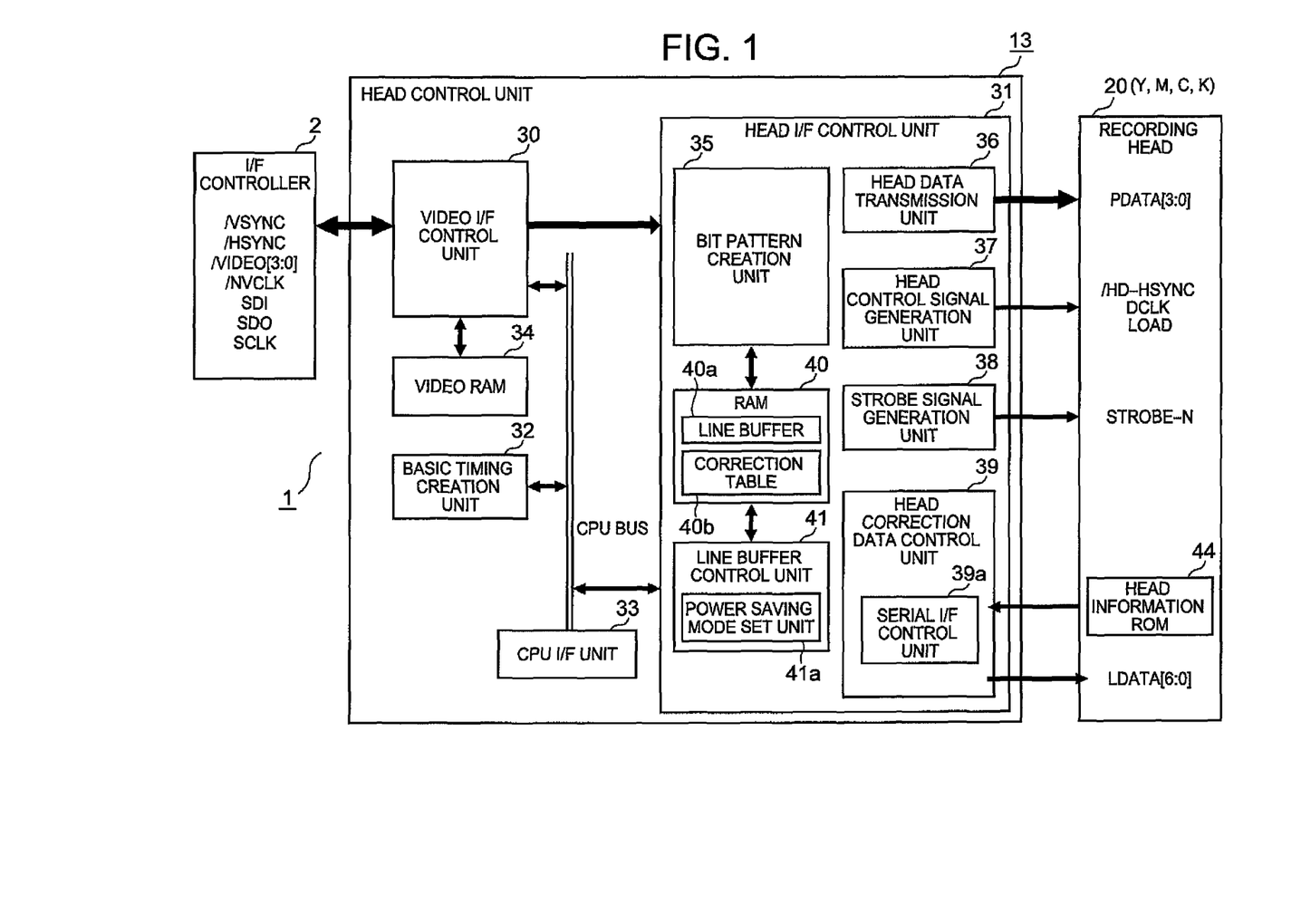
FIG. 1 is an Illustration for explaining the configuration of the head control unit in detail.

FIG. 1 is an illustration for explaining the configuration of the head control unit 13 in detail. The head control unit 13 comprises a video I/F control unit 30, a head I/F control unit 31, a basic timing creation unit 32, and a CPU I/F unit 33. The video I/F control unit 30, head I/F control unit 31, basic timing creation unit 32, and CPU I/F control unit 33 are each connected by a CPU bus. The video I/F control unit 30 exchanges vertical synchronizing signals (VSYNC), horizontal synchronizing signals (HSYNC), video data (Video), and synchronizing signals (VCLK), which will be described later, with the I/F controller 2. Furthermore, the video I/F control unit 30 is also connected to the video RAM 34 and exchanges video data with the video RAM 34.

The head I/F control unit 31 comprises a dot pattern creation unit 35, a head data transmission unit 36, a head control signal generation unit 37, a strobe signal generation unit 38, a head correction data control unit 39, a RAM 40, and a line buffer control unit 41. The dot pattern creation unit 35 creates four or eight staggered light emission video data, which will be described later, based on video data supplied from the video I/F control unit 30 and transfers dot pattern data to the recording head 20 (20Y, 20M, 20C, and 20K) via the head data transmission unit 36.

The head control signal generation unit 37 generates horizontal synchronizing signals (HSYNC) and synchronizing signals (DCLK) for transferring the dot pattern data to the recording head 20 and outputs them to the recording head 20. The strobe signal generation unit 38 generates strobe signals and outputs the strobe signals to the recording head 20. The CPU I/F unit 33 communicates with the MPU 15.

The basic timing creation unit 32 divides video data to be recorded according to predetermined information in the sub-scan direction and creates basic timing according to the throughputs of the individual color recording heads. Signals such as the above-described horizontal synchronizing signals (HSYNC) and dot clock (DCLK) are generated according to various timing signals. Here, for example, the strobe signal generation unit 38 outputs four strobe signals in one writing period TW of recording one dot line image for performing four-step staggered light emission in the sub-scan direction for recording one dot line image as in Embodiment 1 described later. On the other hand, for example, the strobe signal generation unit 38 outputs eight strobe signals in one writing period TW of recording one dot line image for performing eight-step staggered light emission in the sub-scan direction for recording one dot line image as in Embodiment 2 described later.

The head correction data control unit 39 comprises a serial interface control unit ("the serial I/F control unit" hereafter) 39*a* and receives light amount correction data from a head information ROM 44 within the recording head 20. Here, the light amount correction data stored in the head information ROM 44 are correction data obtained by measuring variation in light amount of the light emitting elements constituting the recording head 20 and stored as light amount correction data.

Furthermore, the head correction data control unit 39 writes light amount correction data read from the head information ROM 44 in a correction table 40*b* of the RAM 40 when the recording head 20 makes transition from the power saving mode to the print mode. The RAM 40 also comprises a line buffer 40*a*. The light amount correction data written in the correction table 40*b* are sent to the recording head 20 via the line buffer 40*a*.

The line buffer control unit 41 comprises a power saving mode setting unit 41*a* and is used for dividing video data as described later. Furthermore, drive timing of yellow (Y), magenta (M), cyan (C), and black (K) video data in the power saving mode and the number by which video data are divided are set in the power saving mode setting unit 41*a*.

The structure and drive control method of the recording head 20 will be described in detail hereafter.

The individual color recording heads 20Y, 20M. 20C, and 20K each consist of, for example, eight LED chips lined up in the main scan direction. One LED chip consists of an array of, for example, 960 LED elements (a set of light emitting elements) lined up also in the main scan direction. A total of 7680 LED elements are lined up overall. The recording head 20 used in this embodiment is subject to emission control in which the LED chips are driven individually (staggered emission control), which will be described in detail later. The chips are shifted and tiered in the sub-scan direction in accordance with staggered drive timing in order to cancel the driving time-lag.

Figure 4:
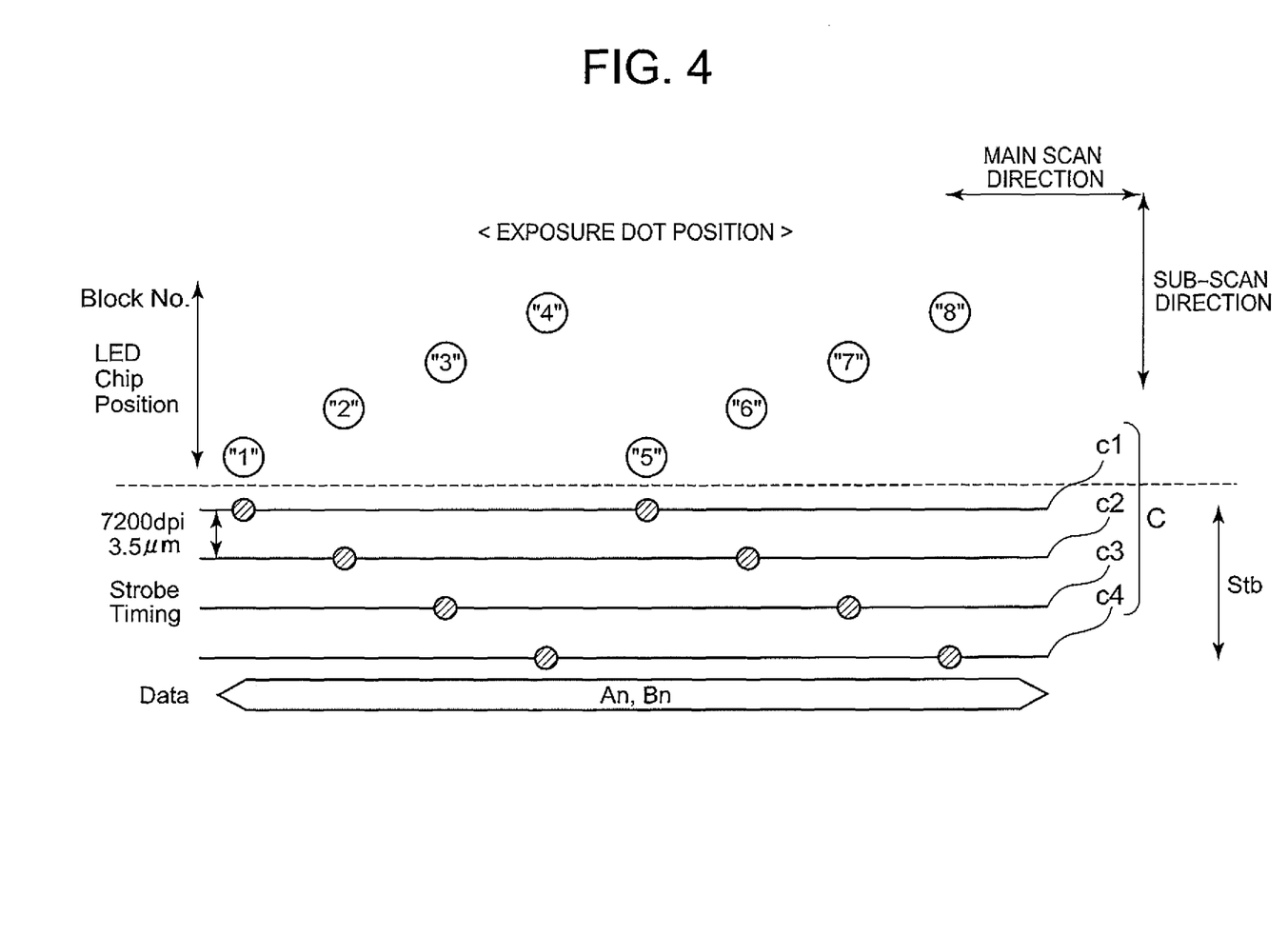
FIG. 4 is an Illustration for explaining the structure of a recording head of Embodiment 1.
Figure 5:
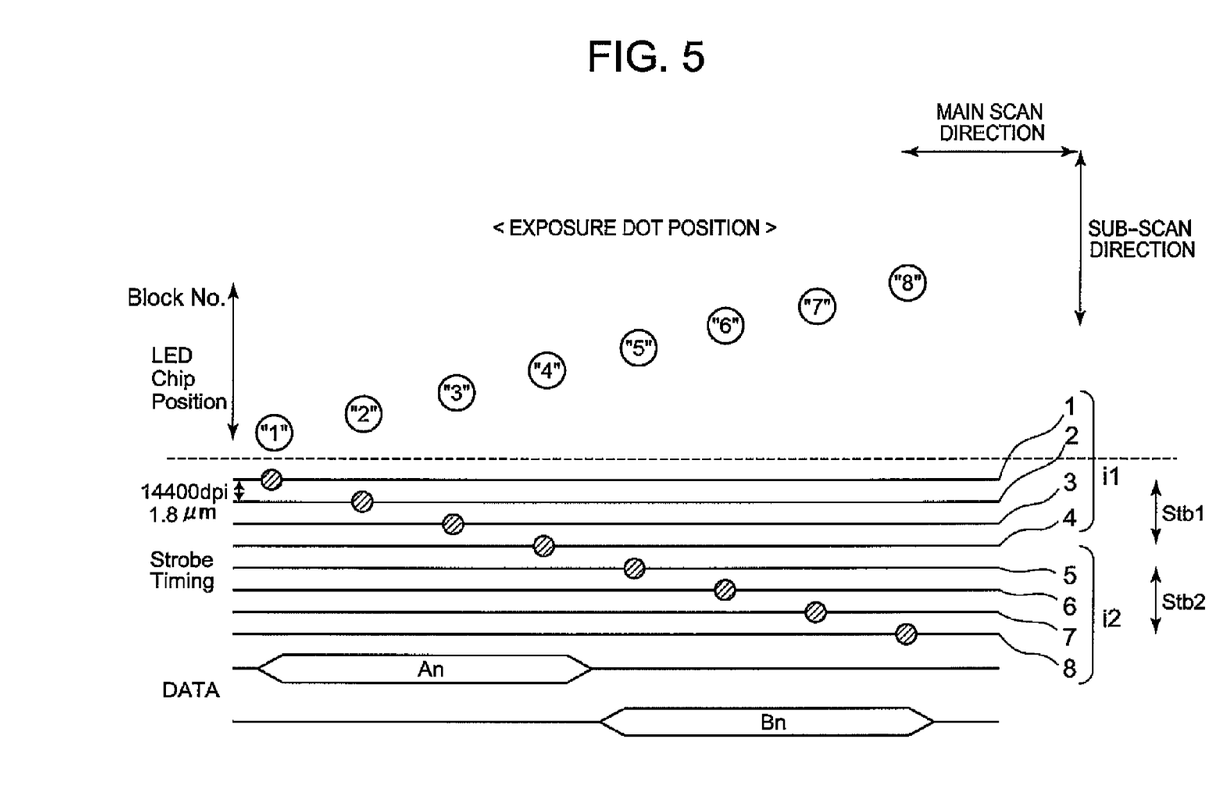
FIG. 5 is an Illustration for explaining the structure of a recording head of Embodiment 2.

More specifically, as shown in FIGS. 4 and 5, the recording head 20 is driven in eight separate blocks in the main scan direction on the basis of a LED chip including a given number of LED elements. As described above, the chips are subject to emission drive control using four or eight staggered strobe signals generated in one writing period TW. Only the LED elements of two chips (1920 elements) or one chip (960 elements) emit light simultaneously.

Here, FIG. 4 shows the structure of the recording head 20 according to Embodiment 1. For example, the K color recording head 20K is supplied with four staggered emission strobe signals (c1 to c4) in one writing period TW of recording one dot line. The LED chips in blocks "1" and "5" are simultaneously driven by the strobe signals c-1. The LED chips in blocks "2" and "6" are simultaneously driven by the strobe signals c-2. The LED chips in blocks "3" and "7" are simultaneously driven by the strobe signals c-3. The LED chips in blocks "4" and "8" are simultaneously driven by the strobe signals c-4.

The strobe signals are generated with a small time-lag in one writing period TW. However, the LED chips are provided in the manner that the time-lag in staggered emission of the chips in the sub-scan direction is cancelled as shown in the chip layout in the upper part of FIG. 4. Therefore, the dot light images exposed on the corresponding photoconductor drums DY, DM, DC, and DK are formed on one line in the main scan direction.

In Embodiment 1 shown in FIG. 4, eight chips are driven at four staggered times. One strobe signal is used to drive two chips. Then, the blocks "1" and "5," blocks "2" and "4," blocks "3" and "5," and blocks "4" and "8" are provided on the same line, respectively, with respect to the sub-scan direction.

On the other hand, FIG. 5 shows the structure of the recording head 20 according to Embodiment 2. Eight blocks ("1" to "8") of LED chips are driven at eight staggered times in one writing period TW of recording one dot line. One strobe signal supplies a drive timing signal to one LED chip. Therefore, all eight LED chips are shifted in the sub-scan direction. More than one chip is not driven simultaneously. Then, the peak current required for driving the recording head for emission can be reduced to a half of that in Embodiment 1.

Figure 6:
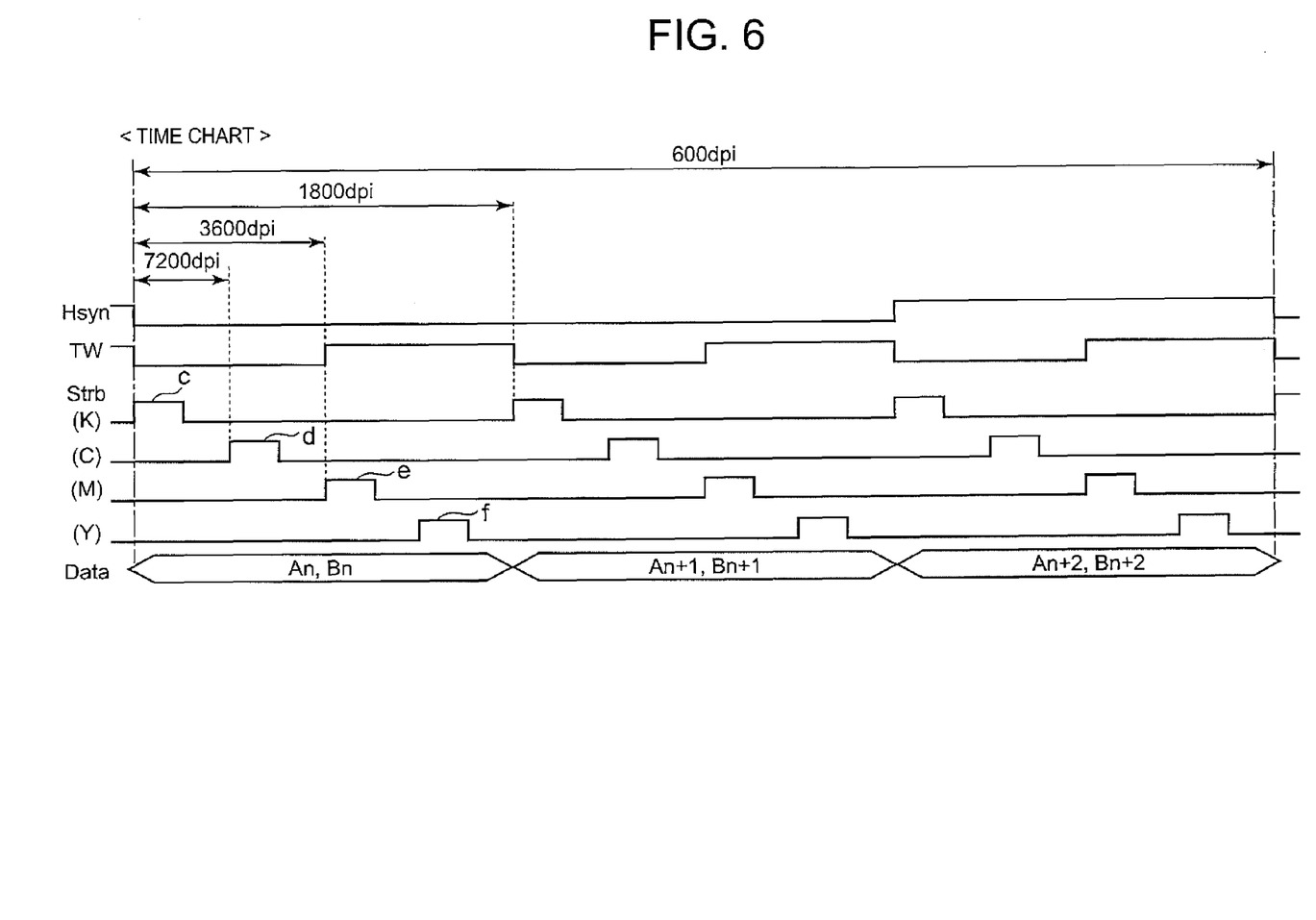
FIG. 6 is a time chart showing by means of strobe signals emission timing of the four color recording heads during recording of a dot line in Embodiment 1.
Figure 7:
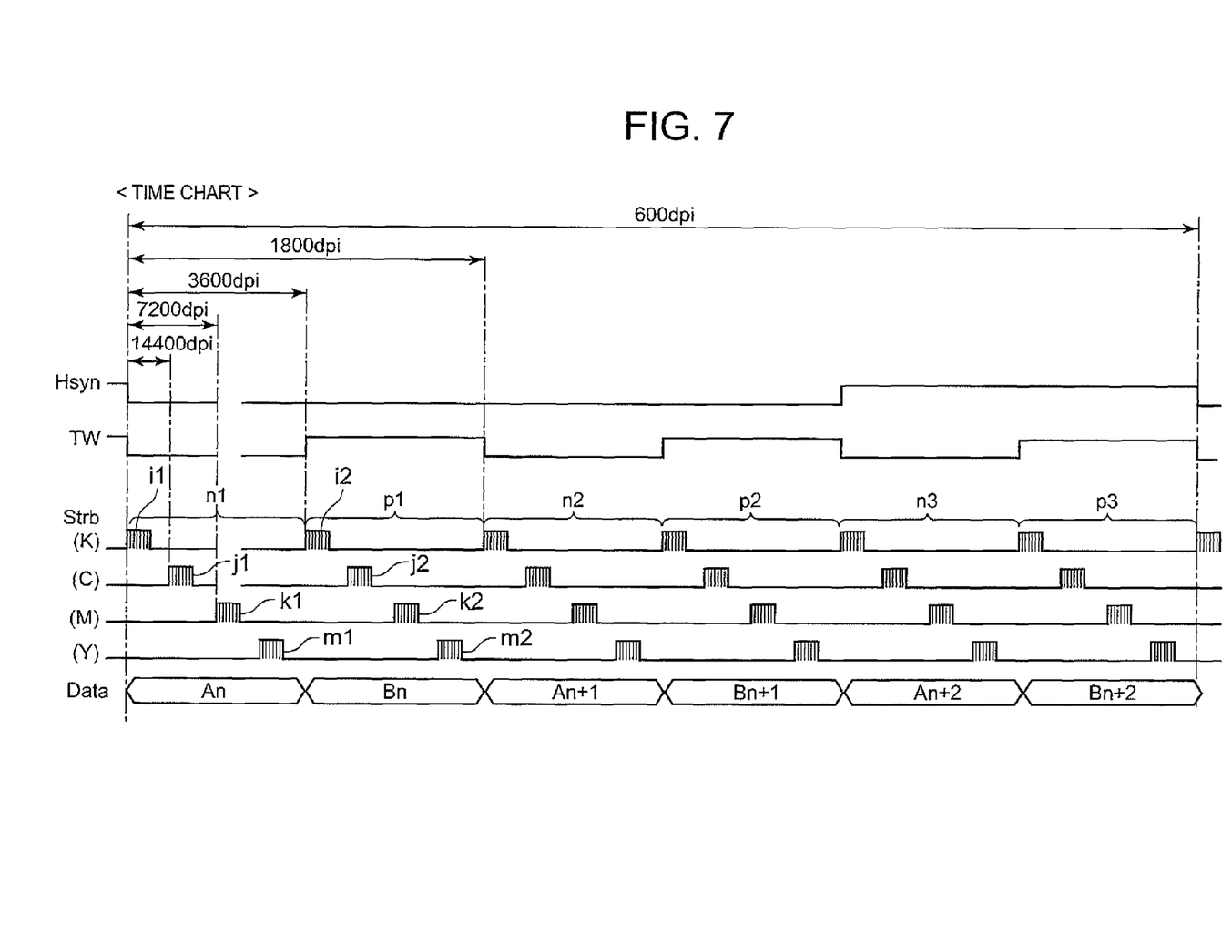
FIG. 7 is a time chart showing by means of strobe signals emission timing of the four color recording heads during recording of a dot line in Embodiment 2.

FIG. 6 is a time chart showing by means of strobe (Strb) signals emission timing of four color recording heads (20Y, 20M, 20C, and 20K) in Embodiment 1 while recording one dot line. On the other hand, FIG. 7 is a time chart showing by means of strobe (Strb) signals emission timing of four color recording heads (20Y, 20M, 20C, and 20K) in Embodiment 2 while recording one dot line.

As shown in these figures, the recording head of the present invention repeats a procedure to form one dot line image in one writing period TW three times in the sub-scan direction so as to form one pixel line image.

In the above explanation, the K color recording head 20K is described in detail. The other recording heads 20Y, 20M, and 20C have the same configuration although they are supplied with different data and driven at different timing for exposure. Therefore, the other color recording heads are not explained here.

Operation in this embodiment having the above configuration will be described hereafter.

Embodiment 1

Figure 8:
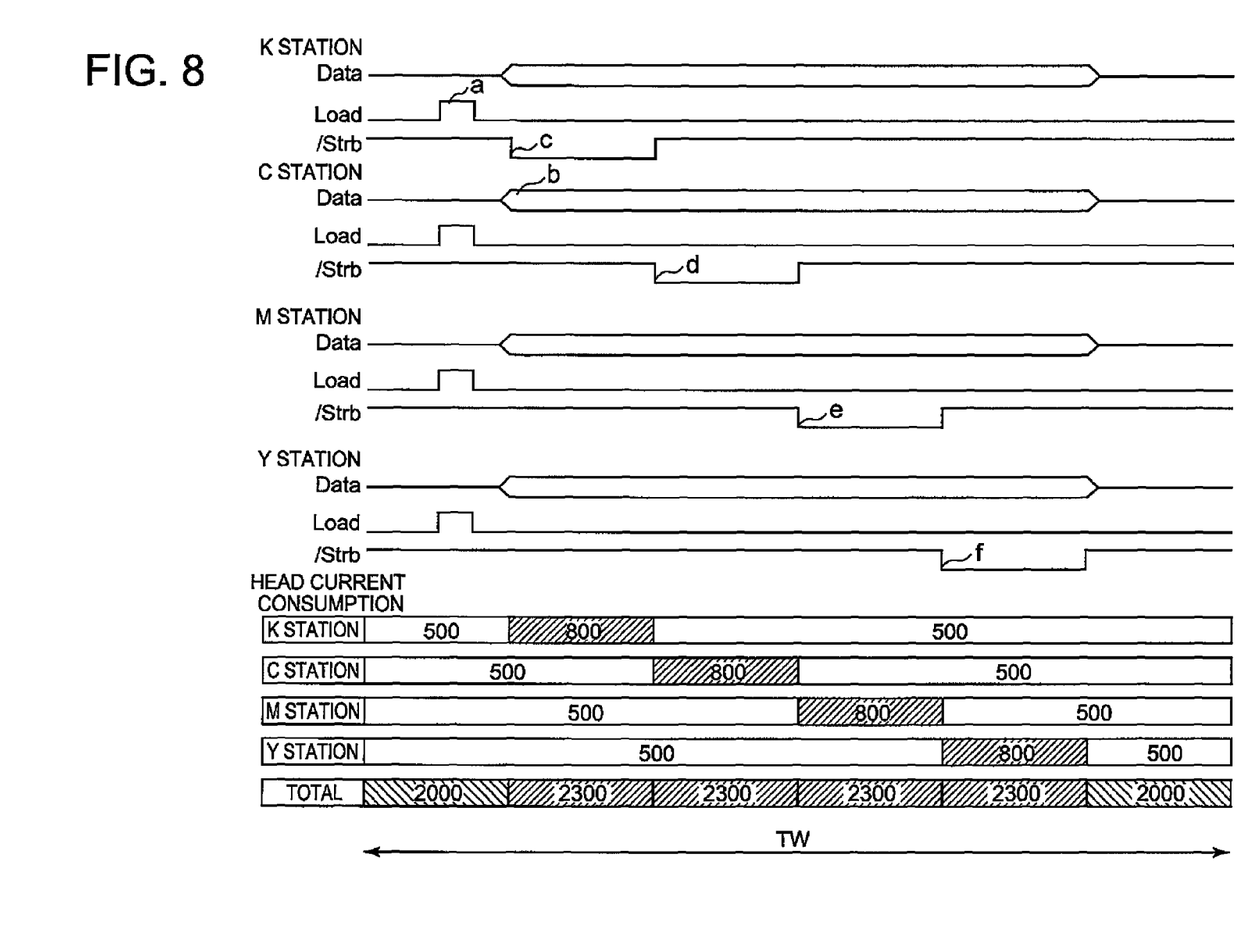
FIG. 8 is a time chart for explaining the operation in Embodiment 1 and an Illustration showing head current consumption data.

FIG. 8 is a time chart for explaining the operation in Embodiment 1 and an illustration showing head current consumption data.

First, print data created by an application in the host machine 28 is sent to the reception control unit 4 from the host machine 28 via an LAN or USB, and further transferred to the memory 9 (standard RAM 9a). The print data are analyzed on commands under the control of the MPU 11 to create drawing data.

The drawing data are subject to page start processing at the time a vertical synchronizing signal (VSYNC) is output (at a low level) and printed at the times shown in FIG. 8. First, a load signal is output from the head control signal generation unit 37 at a time a shown in the figure. The load signal is output simultaneously at the Y, M, C, and K stations. After the load signal is output, yellow (Y), magenta (M), cyan (C), and black (K) print data are supplied to the corresponding recording heads 20Y, 20M, 20C, and 20 K at a time b.

Then, individual color strobe signals are output at different times in accordance with yellow (Y), magenta (M), cyan (C), and black (K) drive timing set in the power saving mode setting unit 41a of the line buffer control unit 41. More specifically, at a time c shown in the figure, a strobe signal is output from the strobe signal generation unit 38 to the black (K) recording head 20K, the black (K) recording head 20K is driven, black print in accordance with the black (K) print data is made on a printing medium. During that time, the recording head 20K undergoes a power consumption of 800 mA and the other, cyan, magenta, and yellow, recording heads 20C, 20M, and 20Y undergo a power consumption of 500 mA.

Furthermore, the strobe signal c given to the K color recording head microscopically consists of four staggered strobe signals as shown in FIG. 4. The strobe signals each selectively drive two blocks of LED chips to emit light simultaneously among the eight separate blocks in the main scan direction, whereby the number of LED elements actively driven in one strobe period is limited to one quarter of the entire heads. Therefore, the current amount required for emission is reduced to one quarter.

Then, at a time d, a strobe signal is output from the strobe signal generation unit 38 to the cyan (C) recording head 20C, the cyan (C) recording head 20C is driven, print in accordance with the cyan (C) print data is made on the printing medium. During that time, the recording head 20C undergoes a power consumption of 800 mA and the other, black, magenta, and yellow, recording heads 20K, 20M, and 20Y undergo a power consumption of 500 mA.

Similarly to the above, the strobe signal d given to the C color recording head 20C microscopically consists of four staggered strobe signals. The strobe signals each selectively drive two blocks of LED chips to emit light simultaneously among the eight separate blocks in the main scan direction, whereby the number of LED elements actively driven in one strobe period is limited to one quarter of the entire heads. Therefore, the current amount required for emission is reduced to one quarter.

Then, at a time e, a strobe signal is output from the strobe signal generation unit 38 to the magenta (M) recording head 20M, the magenta (M) recording head 20M is driven, print in accordance with the magenta (M) print data is made on the printing medium. During that time, the magenta recording head 20M undergoes a power consumption of 800 mA and the other, black, cyan, and yellow, recording heads 20K, 20C, and 20Y undergo a power consumption of 500 mA.

Similarly to the above, the strobe signal e given to the M color recording head microscopically consists of four staggered strobe signals. The strobe signals each selectively drive two blocks of LED chips to emit light simultaneously among the eight separate blocks in the main scan direction, whereby the number of LED elements actively driven in one strobe period is limited to one quarter of the entire heads. Therefore, the current amount required for emission is reduced to one quarter.

Then, at a next time f, a strobe signal is output to the yellow (Y) recording head 20Y, the yellow (Y) recording head 20Y is driven, print in accordance with the yellow (Y) print data is made on the printing medium. During that time, the yellow recording head 20Y undergoes a power consumption of 800 mA and the other, black, cyan, and magenta, recording heads 20K, 20C, and 20M undergo a power consumption of 500 mA.

Similarly to the above, the strobe signal f given to the Y color recording head microscopically consists of four staggered strobe signals. The strobe signals each selectively drive two blocks of LED chips to emit light simultaneously among the eight separate blocks in the main scan direction, whereby the number of LED elements actively driven in one strobe period is limited to one quarter of the entire heads. Therefore, the current amount required for emission is reduced to one quarter.

In the above operation, the multiple color recording heads do not perform exposure simultaneously and all LED elements are not activated simultaneously. The current flowing through all four imaging units is 2000 mA→2300 mA→2300 mA→ . . . 2000 mA. A large current (for example, the above-described current of 3200 mA) does not flow as in a prior art system in which the multiple color recording heads perform exposure simultaneously. In this case, the power consumption during printing can be reduced by 28% compared with the prior art. Consequently, the process in this embodiment can provide a color printer reducing power consumption required by the entire apparatus at the same time and complying with international criteria ensuring sustained earth environment.

Embodiment 2

Figure 9:
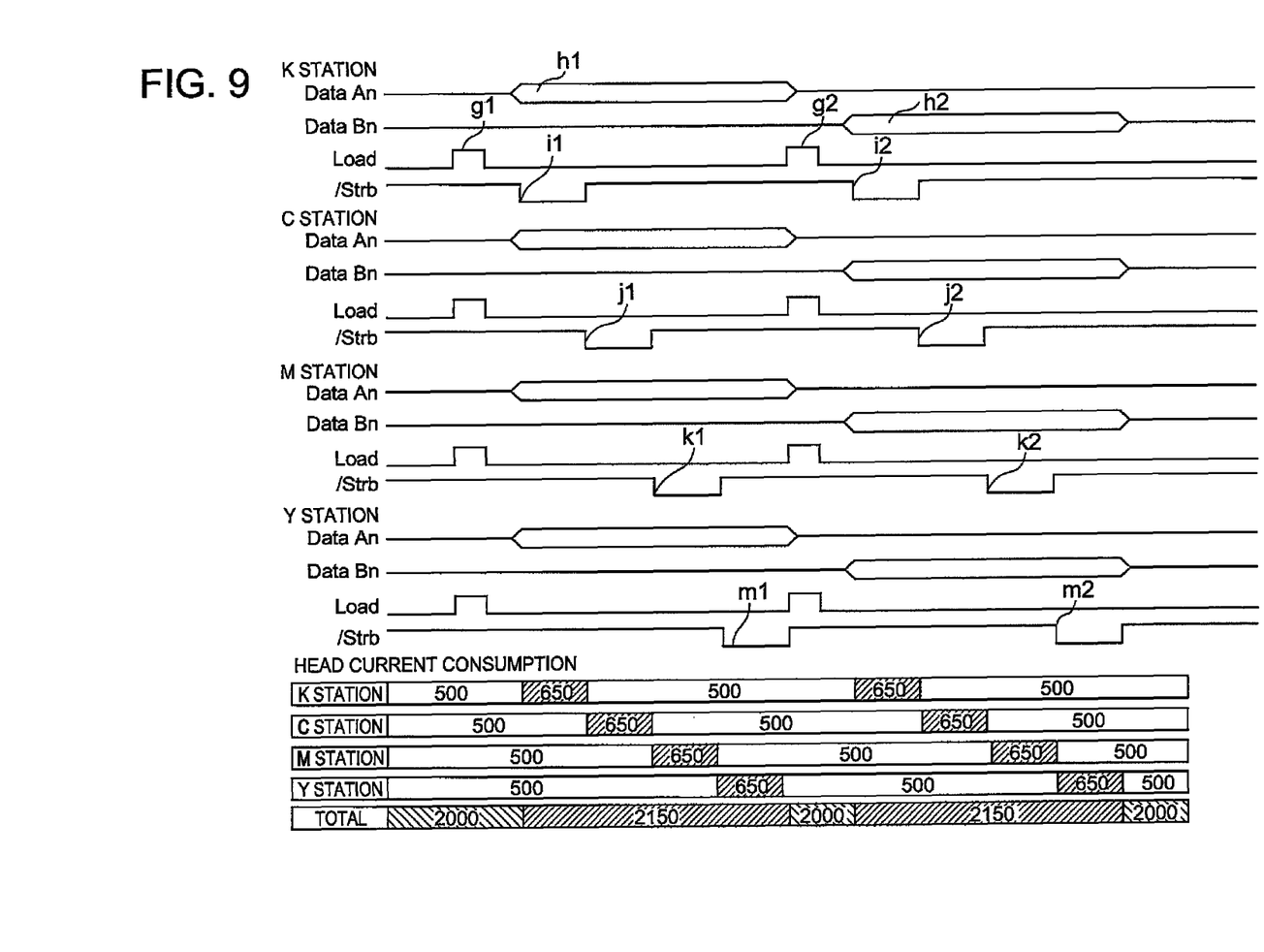
FIG. 9 is a time chart for explaining the operation in Embodiment 2 and an Illustration showing head current consumption data.

FIG. 9 is a time chart for explaining the operation in Embodiment 2 and an illustration showing head current consumption data.

Also in the explanation of this embodiment, the control system of the color printer 1 shown in FIG. 2 and the basic configuration of the head control unit shown in FIG. 1 are the same as those in Embodiment 1.

As described above, first, print data created by an application in the host machine 28 is sent to the reception control unit 4 from the host machine 28 via an LAN or USB, and further transferred to the memory 9 (standard RAM 9*a*). The print data are analyzed on commands under the control of the MPU 11 to create drawing data.

The drawing data are subject to page start processing at the time a vertical synchronizing signal (VSYNC) is output (at a low level) and one dot line image is divided and printed in the first half and in the second half of one writing period TW at the times shown in FIG. 9. First, a load signal for first half data An is output from the head control signal generation unit 37 at a time g1 shown in the figure.

Here, the first half data An consist of image data of only the first half of one dot line image data. The second half of the data consists of all invalid data that are not recorded. The first half load signal g1 is output simultaneously at the Y, M, C, and K stations. After the first half load signal g1 is output, yellow (Y), magenta (M), cyan (C), and black (K) print data An are supplied to the corresponding recording heads 20Y, 20M, 20C, and 20 K at a time h1.

Furthermore, a load signal for second half data Bn is output from the head control signal generation unit 37 at a time g2. Here, the second half data Bn consist of image data of only the second half of one dot line image data. The first half of the data consists of all invalid data that are not recorded. The second half load signal g2 is output also simultaneously at the Y, M, C, and K stations. After the second half load signal g2 is output, yellow (Y), magenta (M), cyan (C), and black (K) print data Bn are supplied to the corresponding recording heads 20Y, 20M, 20C, and 20K at a time h2.

In this embodiment, video data supplied to the recording head 20 for recording one dot line image are divided into two, first half and second half, regions in the main scan direction and supplied in halves at different times. The data An supplied as the first half are half the data for printing one dot line in Embodiment 1. The data Bn supplied as the second half are also half the data for printing one dot line in Embodiment 1.

After the load signal g1 is output, at a time i1 shown in the figure, a first half strobe signal i1 for the first half data An is output from the strobe signal generation unit 38 to the black (K) recording head 20K, the black (K) recording head 20K is driven, print in accordance with the black (K) first half data An is made on a printing medium. Furthermore, at a time i2 shown in the figure, a second half strobe signal for the second half data Bn is output from the strobe signal generation unit 38 to the black (K) recording head 20K, the black (K) recording head 20K is driven, print in accordance with the black (K) second half data Bn is made on the printing medium. Because valid data only for a half of one dot line image data are included whichever strobe signal it is driven by, the recording head 20K undergoes a power consumption of 650 mA and the other recording heads 20C, 20M, and 20Y undergo a power consumption of 500 mA. In other words, only half the amount of current in Embodiment 1 flows through the recording head 20K at this time, reducing power consumption. Here, 500 mA is basic current consumption. A current amount of 300 mA while driven can be reduced by half. In other words, the current flowing through the recording head 20K is reduced to 650 mA as described above.

Furthermore, the strobe signals i1 and i2 given to the K color recording head at two separate times microscopically consist of eight staggered strobe signals as shown in FIG. 5. The strobe signals each selectively drive one block of LED chip to emit light among the eight separate blocks in the main scan direction, whereby the number of LED elements actively driven in one strobe period is limited to one eighth of the entire heads. Therefore, the current amount required for emission is reduced to one eighth.

Then, at a time j1, a first half strobe signal for the first half data An is output from the head control signal generation unit 38 to the cyan (C) recording head 20C, the cyan (C) recording head 20C is driven, and print in accordance with the cyan (C) first half data An is made on the printing medium. Then, at a time j2 shown in the figure, a second half strobe signal for the second half data Bn is output from the head control signal generation unit 38 to the cyan (C) recording head 20C, the cyan (C) recording head 20C is driven, and print in accordance with the cyan (C) second half data Bn is made on the printing medium. Also here, the recording head 20C undergoes a power consumption of 650 mA and the other recording heads 20K, 20M, and 20Y undergo a power consumption of 500 mA.

Similarly to the above, the strobe signals j1 and j2 given to the C color recording head at two separate times microscopically consist of eight staggered strobe signals. The strobe signals each selectively drive one block of LED chip to emit light among the eight separate blocks in the main scan direction, whereby the number of LED elements actively driven in one strobe period is limited to one eighth of the entire heads. Therefore, the current amount required for emission is reduced to one eighth.

Then, at a time k1, a first half strobe signal for the first half data An is output from the head control signal generation unit 38 to the magenta (M) recording head 20M, the magenta (M) recording head 20M is driven, and print in accordance with the magenta (M) first half data An is made on the printing medium.

Then, at a time k2 shown in the figure, a second half strobe signal for the second half data Bn is output from the head control signal generation unit 38 to the magenta (M) recording head 20M, the magenta (M) recording head 20M is driven, and print in accordance with the magenta (M) second half data Bn is made on the printing medium. Also here, the recording head 20M undergoes a power consumption of 650 mA and the other recording heads 20K, 20C, and 20Y undergo a power consumption of 500 mA.

Similarly to the above, the strobe signals k1 and k2 given to the M color recording head at two separate times microscopically consist of eight staggered strobe signals. The strobe signals each selectively drive one block of LED chip to emit light among the eight separate blocks in the main scan direction, whereby the number of LED elements actively driven in one strobe period is limited to one eighth of the entire heads. Therefore, the current amount required for emission is reduced to one eighth.

Then, at a next time m1, a first half strobe signal for the first half data An is output to the yellow (Y) recording head 20Y, the yellow (Y) recording head 20Y is driven, and print in accordance with the yellow (Y) first half data An is made on the printing medium. Then, at a time m2 shown in the figure, a second half strobe signal for the second half data Bn is output from the head control signal generation unit 38 to the yellow (Y) recording head 20Y, the yellow (Y) recording head 20Y is driven, and print in accordance with the yellow (Y) second half data Bn is made on the printing medium. During that time, the recording head 20Y undergoes a power consumption of 650 mA and the other recording heads 20K, 20C, and 20M undergo a power consumption of 500 mA.

Furthermore, the strobe signals m1 and m2 given to the Y color recording head at two separate times microscopically consist of eight staggered strobe signals. The strobe signals each selectively drive one block of LED chip to emit light among the eight separate blocks in the main scan direction, whereby the number of LED elements actively driven in one strobe period is limited to one eighth of the entire heads. Therefore, the current amount required for emission is reduced to one eighth.

In the above operation, the current flowing through all four imaging units is 2000 mA→2150 mA→2000 mA→2150 mA→ . . . . A large current (for example, the above-described 3200 mA) does not flow as in the prior art. In other words, the power consumption can be reduced more in the above operation than in Embodiment 1. In this case, the power consumption during printing can further be reduced by 7% compared with in Embodiment 1.

Video data are transferred two times faster in the operation in Embodiment 2 shown in FIG. 9 than in Embodiment 1 shown in FIG. 8. Video data are transferred in halves as described above. Therefore, one dot line image data are transferred at a time in the time chart of Embodiment 1 without dividing them into An and Bn. One dot line image data are divided into An and Bn and transferred and the corresponding recording head 20 is driven according to the strobe signals in the time chart of Embodiment 2.

The above operation is based on a half-split setting set in the power saving mode setting unit 41a of the line buffer control unit 41. Therefore, although four strobe signals are output in one writing period TW as shown in the time chart of FIG. 8 for recording one dot line image in Embodiment 1, eight strobe signals are output in one writing period (TW) as shown in the time chart of FIG. 9 and divided video data are transferred to the corresponding recording head 20 in Embodiment 2.

For example, with respect to video data An, four strobe signals are output in the first half n1 of one writing period TW shown in FIG. 9 and divided video data are transferred to the corresponding color recording head 20, whereby the recording head 20 is driven by half the power. On the other hand, with respect to video data Bn, four strobe signals are output in the second half p1 of one writing period TW shown in FIG. 9 and divided video data are transferred to the corresponding color recording head 20, whereby the recording head 20 is driven by half the power.

In the same manner, with respect to the next video data An+1 and Bn+1, four strobe signals are output in the first half n2 of one writing period TW shown in FIG. 9 and divided video data An+1 are transferred to the corresponding color recording head 20, four strobe signals are output in the second half p2 of one writing period TW and divided video data Bn+1 are transferred to the corresponding color recording head 20, whereby the recording head 20 is driven each time by half the power.

The above operation is repeated with respect to divided data An+2 and Bn+2, divided data An+3 and Bn+3, . . . ; four strobe signals are output in the first half n2 of one writing period TW, in the second half p2 of one writing period TW, in the first half n3 of one writing period TW, in the second half p3 of one writing period TW, . . . , and divided video data are transferred to the corresponding color recording head 20 in sequence, whereby the recording head 20 is driven each time by half the power.

Here, video data are transferred two times faster in Embodiment 2 than in Embodiment 1. Strobe signals are output in correspondence with a print density of 7200 DPI in Embodiment 1. They are output in correspondence with a doubled print density of 14400 DPI in Embodiment 2.

Furthermore, the power saving mode setting unit 41a is set for half-split in Embodiment 2. The power saving mode setting unit 41a is not restricted to half-split and can be set for three-way or four-way split for further power saving.

In the above embodiments, the LED recording heads are driven in separate blocks on the basis of a LED chip. It is unnecessary that a block consists of a LED chip. A block can consist of any number LED elements that are selectively driven.

Several embodiments of the present invention are described. The present invention includes the invention described in the scope of claims and in the scope equivalent thereto. The invention described in the scope of claims of the original application of this patent application will be described in the following subjunction.

Subjunction 1

A color printer creating video data corresponding to n colors based on print information entered from a host machine, supplying individual color video data to corresponding recording color optical writing recording heads comprising an array of many light emitting elements arranged in a main scan direction, forming individual color images by exposing the individual color image lights consequently emitted on corresponding photoconductive bodies for recording color, the photoconductive bodies being provided to face the optical writing recording heads and moving in a sub-scan direction perpendicular to the main scan direction to form individual color images, and finally merging all color images on a printing medium to form a color image, wherein the color printer comprises:

a recording head selection/activation unit activating individual color recording heads in sequence to enable optical writing in each of periods equal to one n-th of one writing period of the optical writing recording heads;

a video data supply unit applying video data corresponding to one dot line image to be recorded to the recording heads during an activated period of individual recording color recording heads;

a staggered emission drive signal generation unit generating x staggered emission drive signals for each of individual recording color recording heads during the activated period of individual recording color recording heads; and a divided emission control unit selectively activating a block comprising a given number of light emitting elements of the individual color recording heads so as to allow the light emitting elements in the block to selectively emit light based on video data applied to the recording head during each of staggered emission drive periods, and the individual recording color recording heads are provided in the manner that the blocks are shifted in the sub-scan direction by the quantity to cancel the emission time-lag between the light emitting elements in different blocks activated with time-lag by the staggered emission drive signals.

Subjunction 2

The color printer according to Subjunction 1, wherein a plurality of the given blocks that are selectively activated by the divided emission control unit in the staggered emission drive period are provided.

Subjunction 3

The color printer according to Subjunction 1, wherein the light emitting elements are light emitting diodes.

Subjunction 4

The color printer according to Subjunction 1, wherein the color printer is of a tandem type in which imaging units including a yellow recording optical writing head, a magenta recording optical writing head, a cyan recording optical writing head, and a black recording optical writing head, respectively, are arranged in the moving direction of a printing medium.

Subjunction 5

A color printer creating video data corresponding to n colors based on print information entered from a host machine, supplying individual color video data to corresponding recording color optical writing recording heads comprising an array of many light emitting elements arranged in a main scan direction, forming individual color images by exposing the individual color image lights consequently emitted on corresponding photoconductive bodies for recording color, the photoconductive bodies being provided to face the optical writing recording heads and moving in a sub-scan direction perpendicular to the main scan direction to form individual color images, and finally merging all color images on a printing medium to form a color image, wherein the color printer comprises:

a recording head selection/activation unit activating individual color recording heads in sequence to enable optical writing in each of periods equal to one n-th of one writing period of the optical writing recording heads;

a video data dividing/supply unit dividing an activated period of individual recording color recording heads into a first half period and a second half period and applying only video data corresponding to the first half in the main scan direction of one dot line data to the print heads in the first half period and only video data corresponding to the second half in the main scan direction of the one dot line data to the recording heads in the second half period;

a staggered emission drive signal generation unit generating x staggered emission drive signals for each of individual recording color recording heads in each of the first half period and second half period of individual recording color recording heads; and a divided emission control unit selectively activating a specific block of light emitting elements of the individual color recording heads so as to allow the light emitting elements in the block to selectively emit light based on video data applied to the recording head during each of staggered emission drive periods, and the individual color recording heads are provided in the manner that the blocks are shifted in the sub-scan direction by the quantity to cancel the emission time-lag between the light emitting elements in different blocks activated with time-lag by the staggered emission drive signals.

Subjunction 6

The color printer according to Subjunction 5, wherein a plurality of the given blocks that are selectively activated by the divided emission control unit in the staggered emission drive period are provided.

Subjunction 7

The color printer according to Subjunction 5, wherein the light emitting elements are light emitting diodes.

Subjunction 8

The color printer according to Subjunction 5, wherein the color printer is of a tandem type in which imaging units including a yellow recording optical writing head, a magenta recording optical writing head, a cyan recording optical writing head, and a black recording optical writing head, respectively, are arranged in the moving direction of a printing medium.

Having described and illustrated the principles of this application by reference to one (or more) preferred embodiment(s), it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A color printer creating video data corresponding to n colors based on print information entered from a host machine, supplying individual color video data to corresponding recording color optical writing recording heads comprising an array of many light emitting elements arranged in a main scan direction, forming individual color images by exposing the individual color image lights consequently emitted on corresponding photoconductive bodies for recording color, the photoconductive bodies being provided to face the optical writing recording heads and moving in a sub-scan direction perpendicular to the main scan direction to form individual color images, and finally merging all color images on a printing medium to form a color image, wherein the color printer comprises:

a recording head selection/activation unit activating individual color recording heads in sequence to enable optical writing in each of periods equal to one n-th of one writing period of the optical writing recording heads;

a video data supply unit applying video data corresponding to one dot line image to be recorded to the recording heads during an activated period of individual recording color recording heads;

a staggered emission drive signal generation unit generating x staggered emission drive signals for each of individual recording color recording heads during the activated period of individual recording color recording heads; and a divided emission control unit selectively activating a block comprising a given number of light emitting elements of the individual color recording heads so as to allow the light emitting elements in the block to selectively emit light based on video data applied to the recording head during each of staggered emission drive periods, and the individual recording color recording heads are provided in the manner that the blocks are shifted in the sub-scan direction by the quantity to cancel the emission time-lag between the light emitting elements in different blocks activated with time-lag by the staggered emission drive signals.

2. The color printer according to claim 1, wherein a plurality of the given blocks that are selectively activated by the divided emission control unit in the staggered emission drive period are provided.

3. The color printer according to claim 1, wherein the light emitting elements are light emitting diodes.

4. The color printer according to claim 1, wherein the color printer is of a tandem type in which imaging units including a yellow recording optical writing head, a magenta recording optical writing head, a cyan recording optical writing head, and a black recording optical writing head, respectively, are arranged in the moving direction of a printing medium.

5. A color printer creating video data corresponding to n colors based on print information entered from a host machine, supplying individual color video data to corresponding recording color optical writing recording heads comprising an array of many light emitting elements arranged in a main scan direction, forming individual color images by exposing the individual color image lights consequently emitted on corresponding photoconductive bodies for recording color, the photoconductive bodies being provided to face the optical writing recording heads and moving in a sub-scan direction perpendicular to the main scan direction to form individual color images, and finally merging all color images on a printing medium to form a color image, wherein the color printer comprises:

a recording head selection/activation unit activating individual color recording heads in sequence to enable optical writing in each of periods equal to one n-th of one writing period of the optical writing recording heads;

a video data dividing/supply unit dividing an activated period of individual recording color recording heads into a first half period and a second half period and applying only video data corresponding to the first half in the main scan direction of one dot line data to the print heads in the first half period and only video data corresponding to the second half in the main scan direction of the one dot line data to the recording heads in the second half period;

a staggered emission drive signal generation unit generating x staggered emission drive signals for each of individual recording color recording heads in each of the first half period and second half period of individual recording color recording heads; and a divided emission control unit selectively activating a specific block of light emitting elements of the individual color recording heads so as to allow the light emitting elements in the block to selectively emit light based on video data applied to the recording head during each of staggered emission drive periods, and the individual color recording heads are provided in the manner that the blocks are shifted in the sub-scan direction by the quantity to cancel the emission time-lag between the light emitting elements in different blocks activated with time-lag by the staggered emission drive signals.

6. The color printer according to claim 5, wherein a plurality of the given blocks that are selectively activated by the divided emission control unit in the staggered emission drive period are provided.

7. The color printer according to claim 5, wherein the light emitting elements are light emitting diodes.

8. The color printer according to claim 5, wherein the color printer is of a tandem type in which imaging units including a yellow recording optical writing head, a magenta recording optical writing head, a cyan recording optical writing head, and a black recording optical writing head, respectively, are arranged in the moving direction of a printing medium.

* * * * *